US012769890B2

(12) United States Patent
Raju et al.

(10) Patent No.: US 12,769,890 B2
(45) Date of Patent: *Oct. 20, 2026

(54) CONDITION BASED ACCESS OF PROGRAM AND DATA INFORMATION IN A PROCESSOR AND MEMORY SYSTEM

(71) Applicant: Texas Instruments Incorporated, Dallas, TX (US)

(72) Inventors: Veeramanikandan Raju, Bangalore (IN); Jonathan William Nafziger, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 215 days.

This patent is subject to a terminal disclaimer.

(21) Appl. No.: 18/318,060

(22) Filed: May 16, 2023

(65) Prior Publication Data

US 2023/0289485 A1 Sep. 14, 2023

Related U.S. Application Data

(63) Continuation of application No. 17/181,123, filed on Feb. 22, 2021, now Pat. No. 11,693,993.

(51) Int. Cl.
*G06F 21/85* (2013.01)
*G06F 11/30* (2006.01)
(Continued)

(52) U.S. Cl.
CPC .......... *G06F 21/85* (2013.01); *G06F 11/3058* (2013.01); *G06F 21/606* (2013.01); *G06F 21/79* (2013.01)

(58) Field of Classification Search
CPC ..... G06F 11/3058–3062; G06F 21/606; G06F 21/62–629; G06F 21/78–79;
(Continued)

(56) References Cited

U.S. PATENT DOCUMENTS 4,590,552 A 5/1986 Guttag
10,257,052 B1 4/2019 Lønborg
(Continued)

FOREIGN PATENT DOCUMENTS

CN 101364164 B 8/2012
CN 102216998 B 4/2014
(Continued)

OTHER PUBLICATIONS

Notice of Allowance in corresponding U.S. Appl. No. 18/047,439, mailed Feb. 27, 2025, 59 pgs.
(Continued)

*Primary Examiner* — Kevin Bechtel
(74) *Attorney, Agent, or Firm* — Michelle F. Murray; Frank D. Cimino

(57) ABSTRACT

A system including a bus, a processor coupled to the bus, a non-volatile memory coupled to the bus, circuitry for providing a detected condition, and a secure controller. The secure controller is coupled to the circuitry for providing a detected condition and to selectively enable communication of information between the non-volatile memory and the bus in response to the detected condition.

18 Claims, 5 Drawing Sheets

(51) Int. Cl.
*G06F 21/60* (2013.01)
*G06F 21/79* (2013.01)

(58) Field of Classification Search
CPC .............. G06F 21/82–85; G06F 21/88; H04W 4/02–022; H04W 4/025–029; H04W 24/00
See application file for complete search history.

(56) References Cited

U.S. PATENT DOCUMENTS

| | | | | |
|---|---|---|---|---|
| 10,733,291 | B1 * | 8/2020 | McLeod | G06F 11/3058 |
| 2002/0138691 | A1 | 9/2002 | Yamamoto | |
| 2004/0181673 | A1 | 9/2004 | Lin | |
| 2004/0236876 | A1 | 11/2004 | Kondratiev | |
| 2006/0155904 | A1 | 7/2006 | Murakami | |
| 2007/0250906 | A1 | 10/2007 | Hattori | |
| 2011/0153969 | A1 | 6/2011 | Petrick | |
| 2012/0072735 | A1 | 3/2012 | Fukawa | |
| 2014/0137271 | A1 | 5/2014 | Hyde | |
| 2014/0181913 | A1 | 6/2014 | Kling | |
| 2015/0278127 | A1 | 10/2015 | Takakura | |
| 2016/0182565 | A1 * | 6/2016 | Salvador | H04L 63/08 726/1 |
| 2017/0262647 | A1 | 9/2017 | Iwai | |
| 2017/0316222 | A1 | 11/2017 | Muhlestein | |
| 2018/0121366 | A1 | 5/2018 | Tian | |
| 2018/0357184 | A1 | 12/2018 | Arora | |
| 2019/0266037 | A1 | 8/2019 | Shah | |
| 2020/0372164 | A1 | 11/2020 | Raju | |

FOREIGN PATENT DOCUMENTS

| | | | |
|---|---|---|---|
| JP | 2009043030 | A | 2/2009 |
| RU | 2239244 | C2 | 10/2004 |
| WO | 2008094452 | A2 | 8/2008 |

OTHER PUBLICATIONS

International Search Report mailed Aug. 6, 2020, PCT Application No. PCT/US2020033402; 2 pages.
Written Opinion mailed Aug. 6, 2020, PCT Application No. PCT/US2020033402; 4 pages.
National Intellectual Property Administration, PRC, Search Report, Apr. 27, 2026, 12 pages.

* cited by examiner

CONDITION BASED ACCESS OF PROGRAM AND DATA INFORMATION IN A PROCESSOR AND MEMORY SYSTEM

CROSS-REFERENCE

This application is a continuation of U.S. patent application Ser. No. 17/181,123 filed Feb. 22, 2021, which is incorporated by reference herein in its entirety.

BACKGROUND

The example embodiments relate to processor circuits and systems.

Electronic processor circuits, and processor-based systems, process program and data information to perform various functions in a wide variety of apparatus and applications. A processor can be or include various forms, including as examples, a microprocessor, a digital signal processor ("DSP"), or a microcontroller. The processor may be included in a general computing device such as a desktop, laptop, workstation, or smart device, or in an application-specific device that is dedicated to a more narrow area of functionality, such as in industrial or consumer goods. Different computing devices have differing levels of costs, complexity, functionality, criticality, and security. Example embodiments are directed to improving such considerations.

SUMMARY

In one embodiment, there is a system comprising a bus, a processor coupled to the bus, a non-volatile memory coupled to the bus, circuitry for providing a detected environmental condition, and a secure controller. The secure controller is coupled to the circuitry for providing a detected environmental condition and to selectively enable and disable communication of information between the non-volatile memory and the bus in response to the detected environmental condition.

In another embodiment, there is a bus, a processor coupled to the bus, a non-volatile memory coupled to the bus, circuitry for providing a detected network attribute condition of a network communicating with the system, and a secure controller. The secure controller is coupled to the circuitry for providing a detected environmental condition and to selectively enable and disable communication of information between the non-volatile memory and the bus in response to the detected network attribute condition.

Other aspects are also disclosed and claimed.

DETAILED DESCRIPTION

Figure 1:
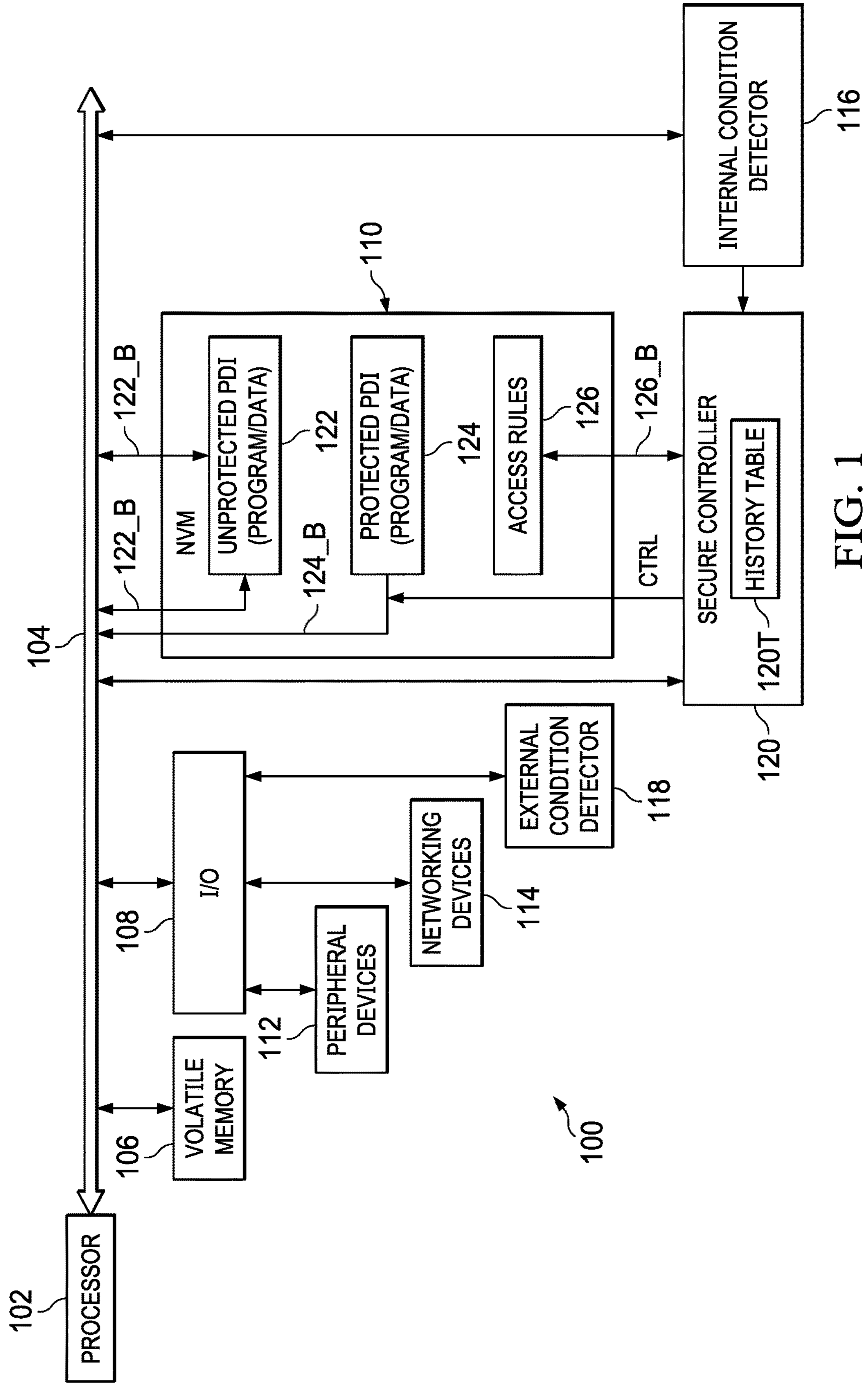
FIG. 1 illustrates an example embodiment processor system with selectively accessible program and data information.

FIG. 1 illustrates an example embodiment processor system 100. The system 100 includes a processor 102, such as a microprocessor, DSP, or a microcontroller (or more than one such device). By way of example, the processor 102 itself may be considered not trusted, that is, not including dedicated hardware or embedded software/firmware to enforce certain protections, and thereby more flexible in its performance but vulnerable to certain types of data and programming access, including the risk of nefarious conduct. As detailed below, however, apart from the processor 102, the system 100 includes separate secure aspects. Accordingly, the processor 102 generally may access other blocks and information in the system 100, except where access is securely limited.

The processor 102 is bi-directionally coupled to a system bus 104. The bus 104 may include plural lines that respectively communicate address, control, and what is referred to in this document collectively as program and data information (PDI). The program information of the PDI, sometimes referred to as code or instructions, is executable by the processor 102 to perform a task(s) with a desirable input and/or output function. The data information of the PDI, sometimes referred to solely as data, is raw fact that, of itself can indicate a state but is not executable, where the state can be part of input or output information in connection with program PDI. The bus 104 is also bi-directionally coupled to three other blocks, namely, a volatile memory block 106, an input/output (I/O) block 108, and a non-volatile memory (NVM) block 110. The volatile memory block 106 requires power to maintain PDI stored in it and commonly includes dynamic random access memory (DRAM) and static random access memory (SRAM), which differ in the frequency at which each requires refreshing. The I/O block 108 provides an interface to devices beyond a boundary associated with the system 100, such as a physical system boundary, provided for example by its housing or structure, or the general location of the system 100. For example, at the same local location as the system 100, the I/O block 108 can couple to peripheral devices 112, such as a keyboard, mouse, other user input device, a display, a printer, and external storage. As another example, the I/O block 108 can couple to networking devices 114, by either wire or wireless connection, through which communications are achievable to remote devices and other local and remote networks, including the Internet.

The processor system 100 also includes one or two condition detectors, shown in FIG. 1 as an internal condition detector 116 and an external condition detector 118. The internal condition detector 116 may be located within a housing or other structure (e.g., circuit board) attached to or enclosing the system 100 or it also may be incorporated into the processor 102. The external condition detector 118 is beyond these boundaries, and may be at a remote location that communicates with the processor system 100, via an appropriate interface, medium, and protocol. As further detailed below, the condition detection detectors 116 and 118 provide condition information to the system 100. The condition information may be detected by, or communicated by some other manner to, each detector 116 and 118, which then provide the information to the system 100. Examples of detected conditions are shown below in FIGS. 2, 4, and 5, which respectively illustrate a condition of geographic location of the system 100, temperature of the system 100, or a network parameter of the system 100, such as network protocol type. Each of the internal condition detector 116 and an external condition detector 118 may be bi-directionally coupled to the bus 104. The internal condition detector 116 may be directly coupled to the bus 104 because the detector 116 is internal. The external condition detector 118 may be coupled to bus 104 by way of the intermediate connection provided by the I/O block 108.

The processor system 100 also includes a secure controller 120, preferably constructed from dedicated hardware and independent of programming executed in the processor 102. The secure controller 120 receives the condition information, for example either directly from the internal condition detector 116 or via the bus 104, such as to receive condition information provided by the external condition detector 118. The secure controller 120 also can store the received condition information, or other usage information pertaining to the use of the system 100, in an internal history table 120T, which as detailed below may store a history of received condition information that thereby identifies prior detected conditions associated with the use of the system 100. The secure controller 120 is coupled to read certain information from the NVM 110, which recall is further coupled to the bus 104. The NVM 110 may store three types of information which, as non-volatile, may be written prior to the general release of the system 100, for example prior to selling a device that includes the system 100. The three information types in the NVM 110 include: (i) unprotected PDI 122, which is accessible by the processor 102 via an addressable bus 122_B that is coupled to the bus 104; (ii) protected PDI 124, which is accessible by the processor 102 via a controlled bus 126_B that is coupled to the bus 104 and provides access, only if such access is selectively enabled by a control (e.g., via a control signal CTRL) from the secure controller 120; and (iii) access rules 126, which are readable by the secure controller 120 via an access bus 126_B, to indicate which protected PDI 124, if any, is accessible given an indicated state by either of the detectors 116 and 118.

Figure 2:
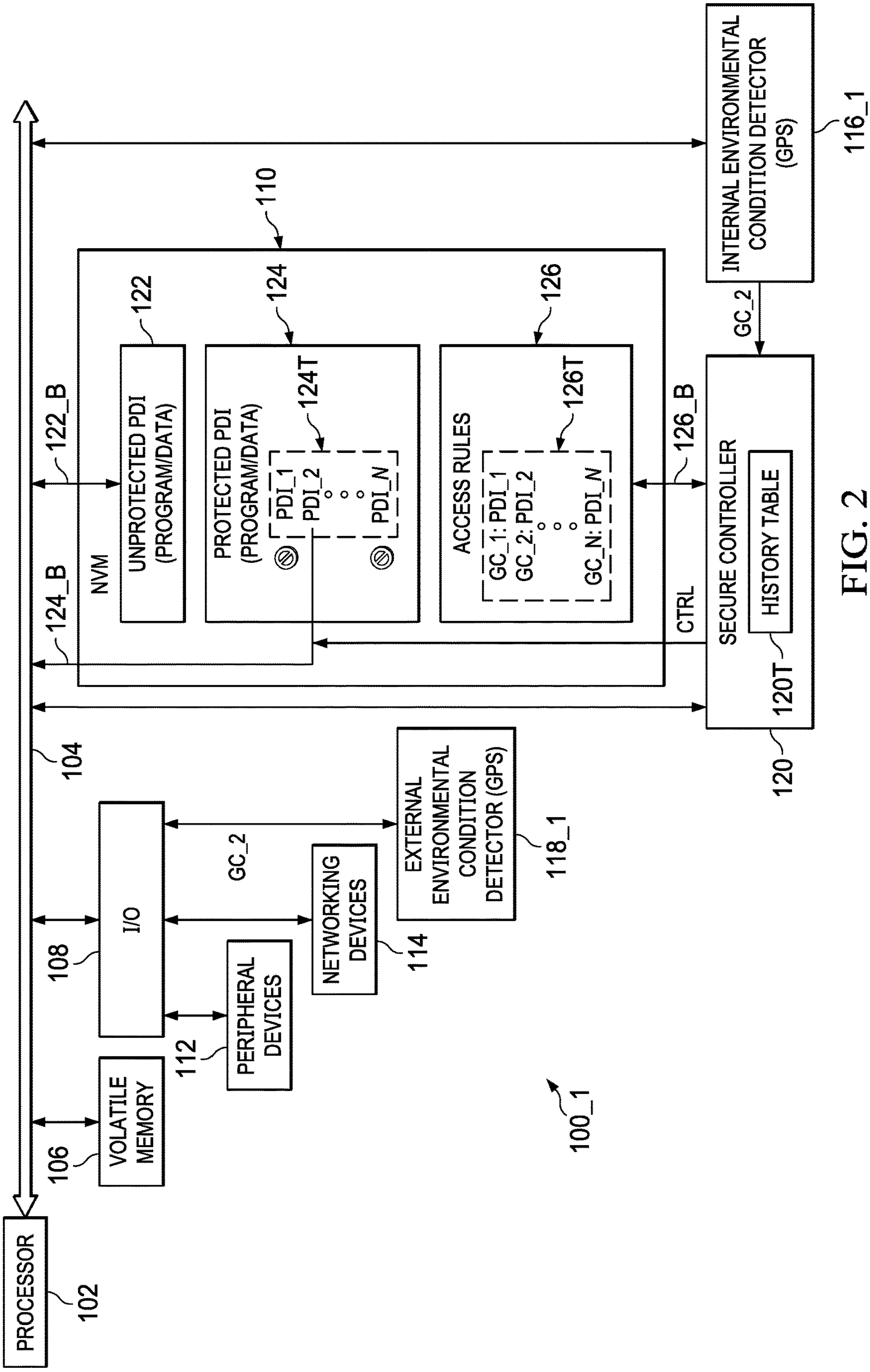
FIG. 2 illustrates an example embodiment processor system with selectively accessible program and data information, in response to geographic location of the system.

FIG. 2 illustrates an example embodiment processor system 100_1, which includes the FIG. 1 system aspects, and where the internal and external condition detectors 116 and 118 are implemented as environmental condition detectors 116_1 and 118_1, each operable to provide to the bus 104 the environmental condition of geographic location of the system 100_1. For example, either or both of the environmental condition detectors 116_1 and 118_1 may be implemented as global positioning system (GPS) receivers or transceivers, either alone or in combination with other location position sensors or indicators, including communications of location information from other remote or local devices. For example, the internal environmental condition detector 118_1 may be included as an integrated GPS functionality of the processor 102. Also in more detail, the protected PDI 124 is stored in the form of a PDI table 126T, and the access rules 126 are stored in the form of an access rule table 126T. The PDI table 126_T includes N addressable entries of protected PDI 124, indicated as PDI_1, PDI_2, . . . , PDI_N, where each entry may be one or plural values, for example a memory region, larger than a single memory entry, and storing a plural data set or an instruction set. The access rule table 126_T includes N GPS geographic condition access rules, GC_1, GC_2, . . . , GC_N, each corresponding and linked to a respective one of the PDI table 126_T addressable entries. For example, the first access rule entry in the table 126T, shown by "GC_1: PDI_1", indicates a correlation of the condition GC_1 to the PDI_1. Specifically, this access rule indicates that detection of the geographic condition detection GC_1 indicates to the secure controller 120, unless overridden by some other consideration detailed below, to grant access to the processor 102, by way of the bus 104, to read the corresponding protected PDI_1. Similarly, the access rule GC_2: PDI_2 indicates an access rule by which the secure controller 120 grants the bus 104 access to the protected PDI_2, if the geographic condition GC_2 is satisfied (and not otherwise overridden), and so forth. Various manners may be used to link an access rule to a corresponding protected PDI, such as including a reference identifier or link in the access rule, or by a virtual memory address offset between an access rule and its corresponding PDI, or still others as may be ascertained by one skilled in the art.

Figure 3:
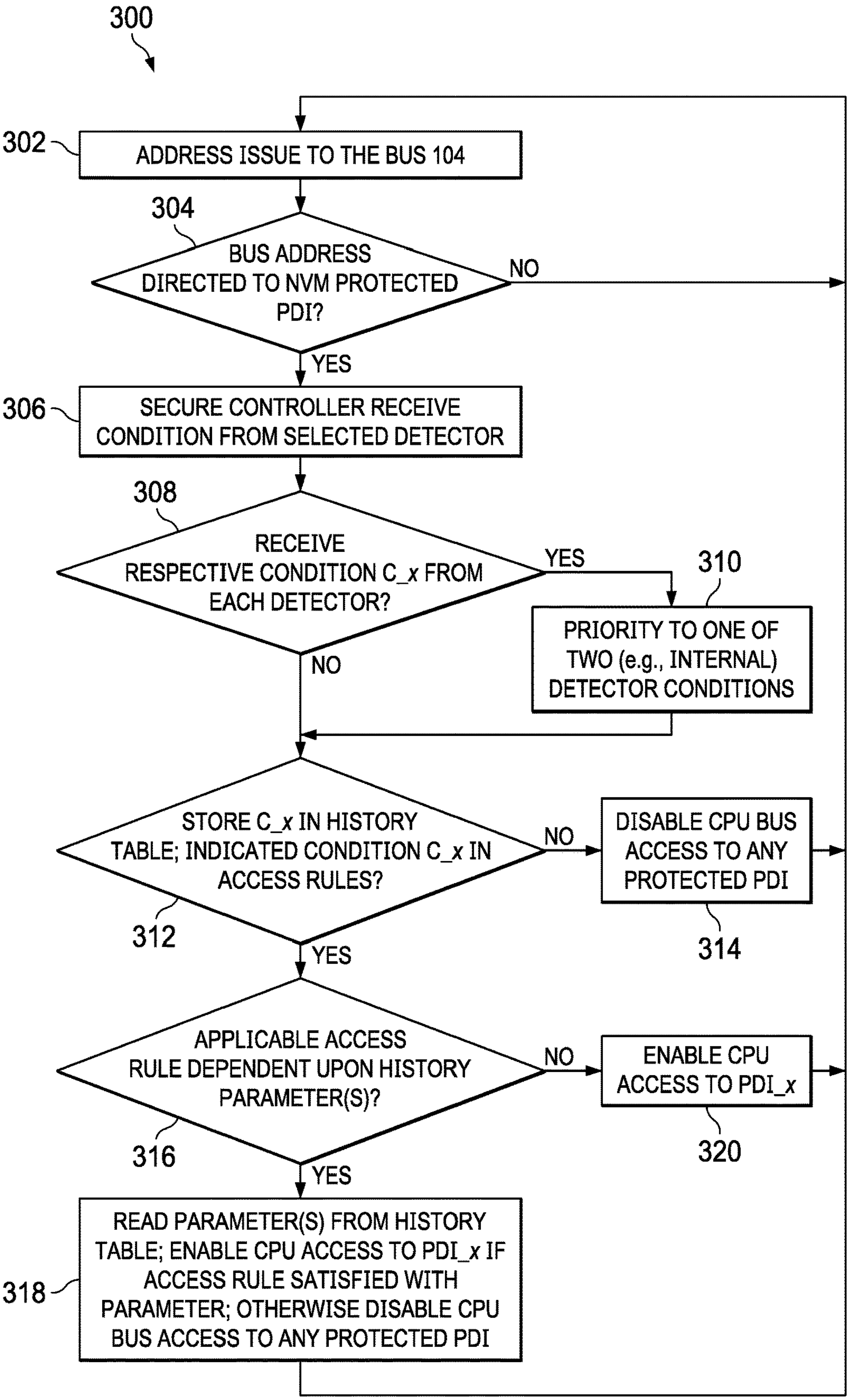
FIG. 3 illustrates a method of operation of the FIG. 1 and FIG. 2 system secure controller.

FIG. 2 also illustrates an example of a particular PDI access under the operation and control of the secure controller 120. Particularly, the secure controller 120 includes sufficient circuitry, such as through logic including state machine(s) to implement the functionality or other circuitry as may be ascertained by one skilled in the art, as is further now explained in connection with the flowchart of FIG. 3. Specifically, FIG. 3 illustrates a method 300 of the secure controller 120 operation, in the context of the system 100 (or of examples of the system described in this document as systems 100_1, 100_2, and 100_3). The method 300 is not intended to illustrate all operations in connection with a CPU-inclusive system, but instead is directed to selected illustrated aspects.

The method 300 commences with a step 302, in which an address is issued to the bus 104, for example from the CPU 102 or some other device (e.g., a separate memory controller, not shown). In a next step 304, the secure controller 120 determines whether the step 302 issued address is directed to the protected PDI 124 in the NVM 110. If the issued address is not directed to the protected PDI 124, for example if that address is directed to the unprotected PDI 122, then other steps may be taken such as the traditional read of, or write to, an unprotected memory. Accordingly, in the example embodiment, memory information other than the protected PDI 124, including unprotected PDI 122 in the NVM 110, may be unaffected by secure protection and may be accessed accordingly, after which the method 300 returns to the step 302 to await a next issued address. If the issued address is directed to the protected PDI 124, then the method 300 continues to step 306.

In the step 306, the secure controller 120 reads or receives a detected condition C_x (e.g., geographic location of the system 100_1), from one or both of the condition detectors 116 and 118, either by selecting one or the other detectors or by allowing each detector to report a condition, if available, to the secure controller 120.

Next, in a step 308, if the secure controller 120 receives respective detected conditions from both of the condition detectors 116 and 118 in the step 306, then the method continues to a step 310. Alternatively, if the secure controller 120 receives a condition only from one of the condition detectors 116 and 118, then the method continues to a step 312.

In the step 310, the secure controller 120 gives higher priority to one of the two received conditions. For example, in a preferred embodiment, the secure controller uses only the condition of the internal condition detector 116 and not the condition of the external detector 118, in the instance of receiving a condition from each detector. Note that the priority selection of the step 310 may be configurable in the secure controller 120. In any event, upon concluding step 310, or step 308 if only one condition detector 116 and 118 provides a detected condition, then next the method 300 continues to the step 312.

In the step 312, the secure controller 120 stores the step 308 provided condition C_x in the history table 120T, and it also determines whether the step 308 provided condition C_x, here as an example being a detected geographic condition GC_x, has a corresponding entry in the access rules table 126T, that is, whether that condition corresponds to one of the geographic condition access rules GC_1, GC_2, . . . , GC_N. Note that each of the access rules 126 may correspond to a geographic range, such as a respective country or regional perimeter, for example with GC_1 as Europe, GC_2 as the United States, GC_3 as Japan, and so forth. If the step 306 condition C_x does not have a corresponding access rule in the table 126T, then the method 300 continues to a step 314. If the step 308 provided condition C_x has a corresponding access rule in the table 126T, then the method 300 continues to a step 316.

In the step 314, the secure controller 120 disables access by the bus 104 to any of the protected PDI 124, because the indicated condition C_x is not identified in the access rule table 126T. For instance, recalling the above example of three geographies consisting of GC_1 as Europe, GC_2 as the United States, and GC_N as Japan, and assuming there are only these three entries in the access rules table 126T, assume next that the system 100_1 is located in Africa when the step 302 address is issued to the bus 104. If the step 304 then detects a bus address directed to the protected PDI 124 of the NVM 110, then in the step 306 the secure controller 120 receives a geographic condition GC_x indication of Africa (from either an internal or external condition detector 116 or 118), followed later by the step 312 determining that there is no access rule table 126T corresponding to GC_x (Africa), so the method continues to the step 314. Accordingly, in the step 314, the secure controller 120 disables access by the bus 104 to any of the protected PDI 124, so in the example provide, the system being located in Africa causes a disablement of CPU access to the protected PDI 124. After the secure controller 120 disables the access to the protected PDI 124, the method 300 returns to the step 302 to await a next issued address.

In the step 316, the secure controller 120 determines whether the applicable access rule, corresponding to the detected condition C_x, is dependent on one or more history parameters in the history table 120T. For instance, recall the example above, where the access rules table 126T has rules corresponding to only three geographies, GC_1 as Europe, GC_2 as the United States, and GC_N as Japan. With respect to step 316, however, assume the GC_2 access rule directed to the United States is further conditioned on at least another geographic condition parameter stored in the history table 120T, for example, that past-history geographic consideration that the system 100 has not detected to be in Africa on more than five other occasions; further, the past-history geographic consideration can be combined with one or more additional parameters, for example, whether the past history occurred with a certain period of time (e.g., in the last 30 days, in which case each time step 312 stores a detected condition, it may store additional information, such as a date/time stamp). Accordingly, if the applicable access rule is further dependent upon a history parameter as in this example, then method 300 continues to step 318. If the applicable access rule is not further dependent upon a history parameter as in this example, then method 300 continues to step 320.

In the step 318, the secure controller 120 reads the additional conditioned history parameter(s) from the history table 120T to determine if the corresponding access rule, conditioned on both the condition C_x and the additional parameter is satisfied. In the example above, for instance, C_x indicates a detected geographic condition of the United states, and if the system 100 has not been detected to be in Africa on more than five occasions (possible also in the last 30 days), then the secure controller 120 detects the full satisfaction of the access rule and enables the bus 104 access to the protected PDI 124 corresponding to C_x. In FIG. 2, such enabled access is shown in that the secure controller 120 provides a CTRL to enable access of the entry in the PDI table 126T, corresponding to GC_2, where the correspondence is indicated for example in the table 126T, as PDI_2. In FIG. 2, therefore, the bus 126_B is shown to couple PDI_2 from the protected PDI table 126T to the bus 104. Note that the actual apparatus for enabling the access may be of various forms, such as through a memory application programming interface (API) or through a hardware gating system. Moreover, the granted access may be full (e.g., read/write) or limited in some way, for example if the memory from which the protected data is writable, then the access can be limited to read only. Also in FIG. 2, while access is enabled as to PDI_2, at the same time access is disabled to the other PDI in the protected PDI 124, as shown by a no-access symbol next to PDI_1 and PDI_N. After the secure controller 120 enables the access to the otherwise protected PDI 124, the method 300 returns to the step 302 for awaiting a next issued address. Alternatively in the step 318, if the access rule is not fully satisfied by the condition C_x and the additional parameter(s) from the history table 120, then the step 318 disables the bus 104 from accessing the protected PDI 124, and the method 300 returns to the step 302 for awaiting a next issued address.

The preceding demonstrates that example embodiments provide secure controller oversight resulting in selectively permitted NVM PDI access, based on a condition provided by at least one or more condition detectors 116 and 118 (and optionally one or more additional conditional parameters, for example stored in the history table 120T). In the example of FIG. 2, the condition is an environmental condition, namely, the geographic location of the system 100_1. As a result, the access rules 126 may be populated to enable, or disable, access to certain PDI based on system location. Numerous different functional embodiments may be achievable with such selective access to otherwise protected PDI.

In one example embodiment, the system 100_1 may include different programming instruction sets as the protected PDI 124 and corresponding to different geographies, where the secure controller 120 provides the bus 104, and thereby the processor 102, access (and the ability to thereby execute) to only the programing instruction set permissible for a corresponding geography. In this manner, for example, the system 100_1 may include a number of different program instruction sets in the NVM 126, but the system 100_1, and thereby its user, is only able to use a set or sets for which the user has paid and that correspond to the user's permissible geography. Another example of geographically-enabled/disabled NVM 110 programming may be legal compliance, such as the secure controller 120 providing access only to protected PDI 124 that complies with geographic-specific import/export regulation or laws, while disabling access to other programming PDI stored in the NVM 110 and compliant with other respective geographies. Note that such geographic limitations can be imposed in geographies much smaller than countries or the like. For example, where GPS or other location services are sufficiently accurate, limitations could be imposed on a per building or street area, the latter for example in government restricted zones, private restricted zones, safety zones (e.g., school zones), and the like. The above examples may more generally suggest, but do not necessitate, a portable implementation of the system 100_1, but other embodiments may exist where the system 100_1 is more fixed in position, including in devices used as part of the internet of things (IOT).

In another example embodiment, the system 100_1 may be implemented into a smart-grid metering device, for example where the processor 102 accesses programming and/or additional circuitry to perform smart-grid metering functionality. In this embodiment, the secure controller 120 provides selective access to the protected PDI 124, to enable programming PDI access and execution for full system performance, or to access data PDI that provides certain parameters, without which the program will not function. Other protected PDI 124 may be selectively accessible, based on geography, that defines attributes of metering device operation, for example by providing geography-specific electricity pricing as the protected PDI 124. Such an embodiment permits area specific metering for varied monetization essential service usages, including for example different electricity usage rates (where rate is the selectively accessible protected PDI 124) selected in different areas based on population density, for example charging higher rates for water/electricity usages in more dense areas.

In another example embodiment, the system 100_1 may be implemented into a building automation device, for example where the processor 102 accesses programming and/or additional circuitry to perform building automation device functionality. For example, the system 100_1 may be included in a thermostat or a door lock installed in a given house. In these embodiments, the access rules 126 and protected PDI 124 are programmed into the NVM 110 to enable selective access of either program or data PDI necessary for the automation device to function only at the geographic location of the particular house. Accordingly, the automation device will not function, either partially or wholly, if moved to another location, either voluntarily or involuntarily. This embodiment provides a way for door lock providers to prevent reuse of deployed devices, without authority of the provider.

In another example, the system 100_1 may be implemented into an autonomous vehicle, so as to control vehicle features based on vehicle location, for example where the processor 102 accesses programming and/or additional circuitry to perform autonomous vehicle functionality. For example, the bus 104 can be selectively disabled from accessing the protected PDI 124 needed to execute infotainment services, when either condition detector 116_1 or 118_1 indicates the vehicle has entered certain regions of a city. As another example, vehicle camera sensor programming or data, in the form of protected PDI 124, can be selectively disabled from bus 104 access when the vehicle is detected to be in defense sensitive areas.

In another example embodiment, the system 100_1 may be implemented in industrial logistics robots, for example to selectively access control robot function or movement PDI based on robot location. For instance, the access rules 126 can be programmed to indicate that the secure controller 120 grant the bus 104 access to protected PDI 124 only when the robot is located within a defined building area or on an industrial floor. Or, the protected PDI 124 may include different parameter values, such as packaging, labelling, and or price tags, where the secure controller 120 selectively enables access by the bus 104 to a particular parameter based on the robot location.

In another example embodiment, the system 100_1 may be implemented in a communications device, for example, in which its secure controller 120 selectively enables and disables communications based on communication device location. Other selectively enabled and disabled PDI can include network provisioning information.

Figure 4:
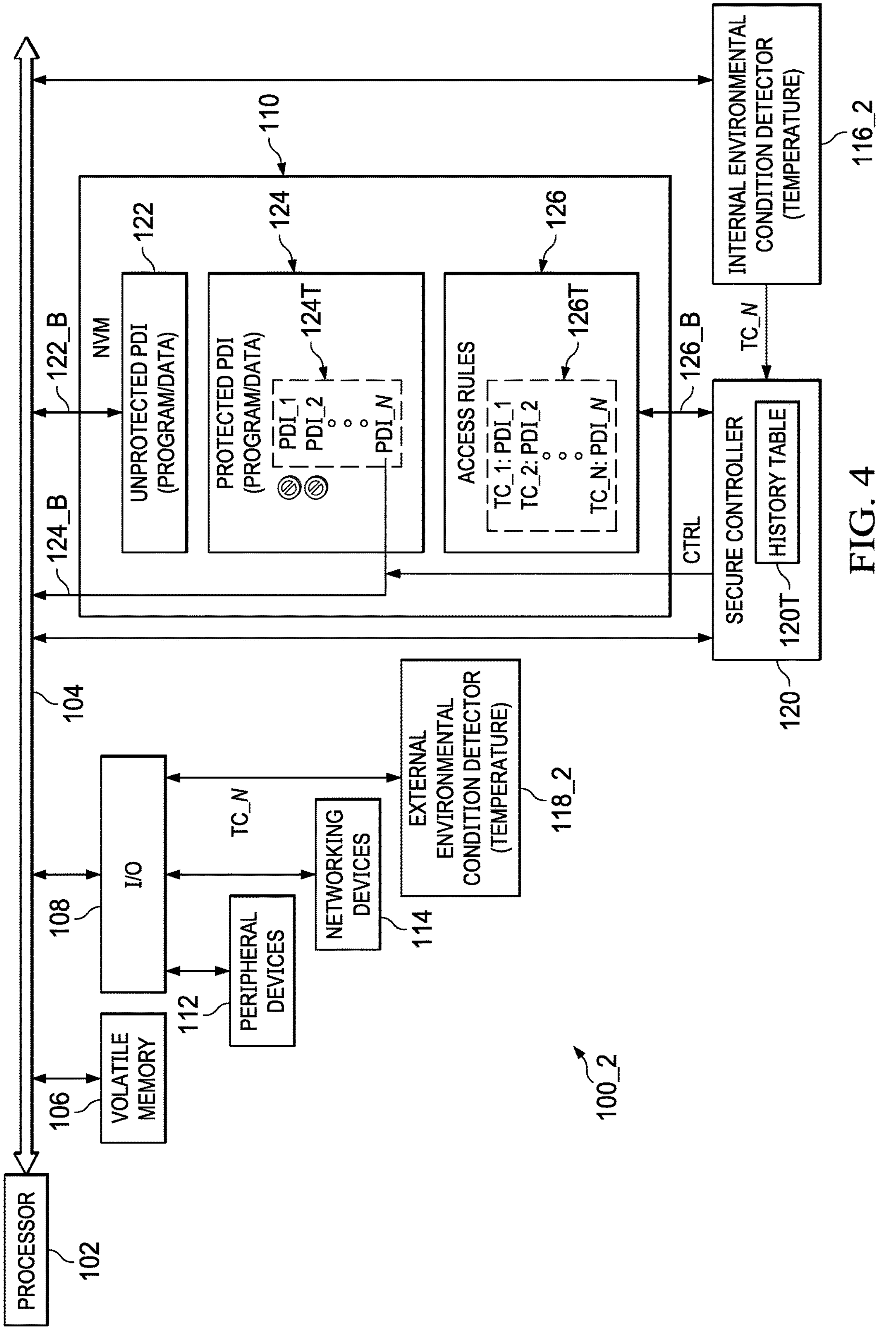
FIG. 4 illustrates an example embodiment processor system with selectively accessible program and data information, in response to system temperature.

FIG. 4 illustrates an example embodiment processor system 100_2 that includes the FIG. 1 system aspects and where the internal and external condition detectors 116 and 118 are implemented as environmental detectors 116_2 and 118_2, each operable to provide to the bus 104 an environmental temperature of the system 100_1. Generally, the system 100_2 may operate according to the above-described FIG. 3 method 300. Further, and by example, the priority may be given to the internal environmental temperature from the internal condition detector 116_2, as compared to the external environmental temperature from the external condition detector 118_2. In this manner, the detected internal temperature may be of greater priority as a basis of the thermal capacity of the system 100_2. Also for example, the internal condition detector 116_2 may be implemented as an integrated circuit (IC) temperature sensor (e.g., thermistor or silicon bandgap temperature sensor), while the external condition detector 118_2 may be a nearby or even remote weather reporting device (e.g., IOT device) or facility. In the system 100_2, the access rules table 126T has N temperature condition (TC) rules TC_1, TC_2, . . . , TC_N, each corresponding to one of N respective sets of addressable protected PDI 124 entries, including PDI_1, PDI_2, . . . , PDI_N. For example, assume that the system 100_2 is located in an environment with a temperature matching, or falling within, a range defined by the temperature condition TC_N. Accordingly, FIG. 4 illustrates that temperature condition TC_N, indicated by both of the temperature condition detectors 116_2 and 118_2, is provided to the secure controller 120 either directly or through the I/O block 108 and the bus 104. In response and also shown in FIG. 4, the secure controller 120 processes the access rule in the access rule table 126 corresponding to TC_N, and assuming no other parameter is to be conditionally evaluated in the history table 120T, then the secure controller 120 selectively enables access (via CTRL) by the bus 104 to the corresponding PDI_N in the PDI table 126T. Accordingly, the processor 102 is granted such access and can either execute programming in PDI_N or operate in response to data in PDI_N, or both, and thereby in response to temperature. Meanwhile, the bus 104, and consequently the processor 102, is selectively disabled from accessing any other PDI in the PDI table 126T, as shown by a no-access symbol next to PDI_1 and PDI_2.

The system 100_2 may be implemented in numerous devices in which the secure controller 120 may selectively enable or disable protected PDI 124 access, in response to the system 100_2 temperature. For example, different PDI sets can be included in the PDI table 126T, and the secure controller 120 can selectively enable or disable access to that PDI in response to temperature-based access rules in the access rule table 126T. Accordingly, the access rules 126 and respective protected PDI 124 may be stored in the NVM 110 to ensure reliability of the device and also to enforce that the device is getting used for valid reliable temperature ranges only in the field. Alternatively, for either geography, temperature, or other conditions, these embodiments may accordingly condition access to protected PDI 124 so as to verify such PDI is used in only the correctly verified or desirable operating conditions, and such a system or device may be functionally partitioned or its specification trimmed to align with such conditions.

In another example embodiment, the system 100_2 may be implemented into a smart-grid metering device. In this embodiment, the access rules 126 direct the secure controller 120 to selectively provide bus 104 access to the protected PDI 124 sufficient to run the system 100_2 only in an appropriate temperature range. Accordingly, a single meter design may include a number of different instruction sets as different PDI 126, whereby one meter of that design may be employed in one temperature environment and another such meter in a different environment (e.g., residential, factory, location subject to varied temperatures and the like), with each meter having a secure controller 120 that selectively enables access to program and data PDI 126 corresponding to the system temperature condition, for example to charge a particular energy rate based on then-detected temperature.

In another example embodiment, the system 100_2 may be implemented into a building automation device. For example, the system 100_2 may be included in a fire alarm panel selectively enabled to access PDI 126 for operating in a relatively higher temperature range. Accordingly, the fire alarm panel access rules 126 are provided so that when the panel is exposed to such temperatures, the secure controller 120 selectively enables access to corresponding high temperature PDI, while disabling access to other PDI.

In another example embodiment, the system 100_2 may be implemented into an automobile circuit or block. For example, the system 100_2 may be included in an advanced driver-assistance systems (ADAS) circuit. Accordingly, the ADAS circuit access rules 126 are provided so that when the ADAS circuit is exposed to relatively high temperatures, the secure controller 120 selectively disables access to lower temperature applicable PDI, so as to increase the safety margin of operation at higher temperatures.

Figure 5:
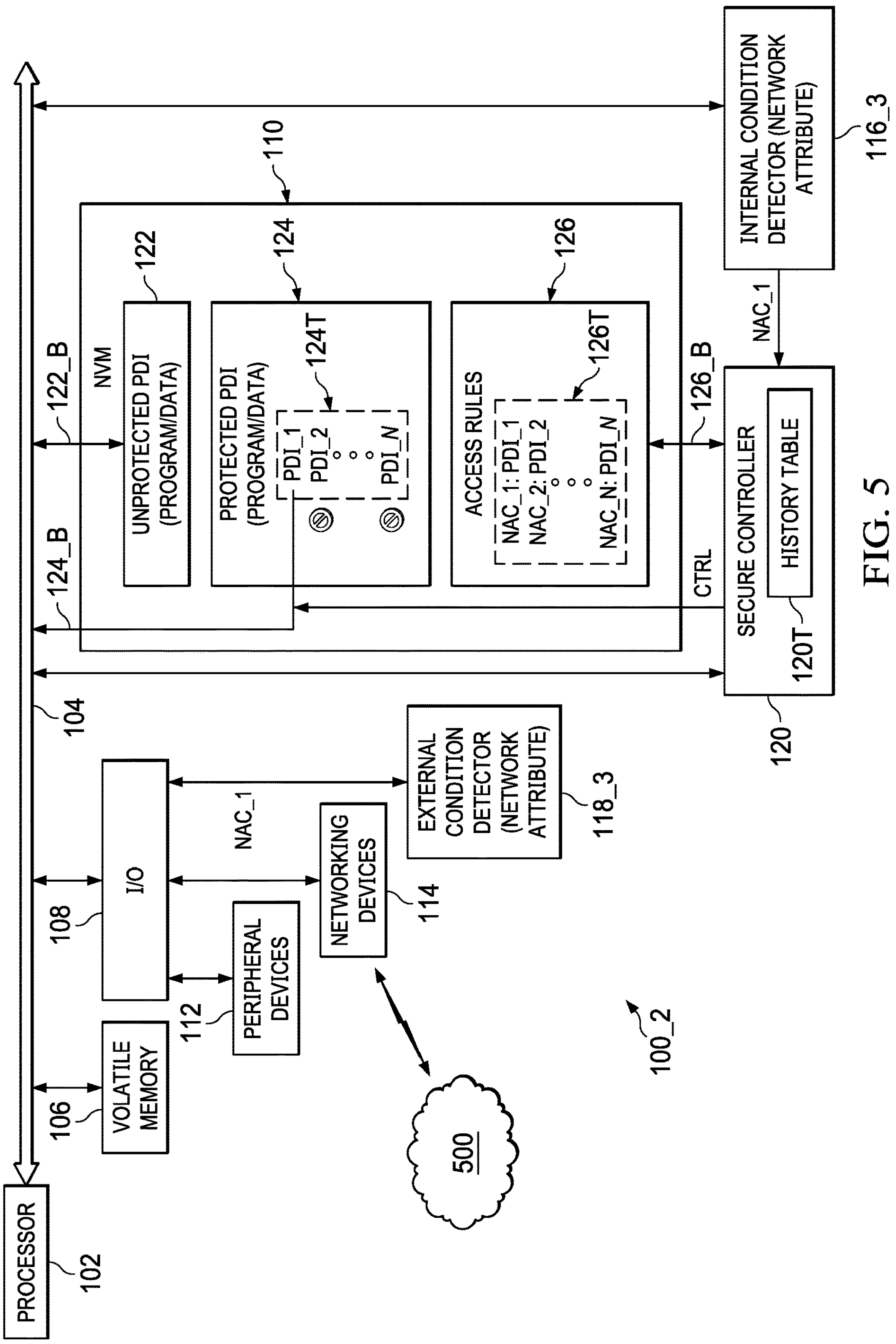
FIG. 5 illustrates an example embodiment processor system with selectively accessible program and data information, in response to system network connectivity.

FIG. 5 illustrates an example embodiment processor system 100_3 that includes the FIG. 1 system aspects and where the internal and external condition detectors 116 and 118 are implemented as detectors 116_3 and 118_3, each operable to detect and provide to the bus 104 a network connectivity attribute of the system 100_3, as that attribute relates to a network 500 communicating with the system 100_3 as detectable by either the detectors 116_3 or 118_3 or by communications through the networking devices 114. For example, such network attribute may be the network connectivity protocol, for example, determined based on the radio frequency (RF) band that is active and possibly also the RF network type that is present either within the system 100_3 (e.g., radio Controller) or an external radio controller connected to the system 100_3. For instance, such protocols can be SubGHz, WiFi Bluetooth low energy (BLE)/Zigbee, mesh, ZWave, Zigbee, WiSUN, or the like. As another example, such network attribute may be a network parameter, such as quality of service (QoS) or level of network security. In any event, in the system 100_3, the access rules table 126T has N network attribute condition (NAC) rules NAC_1, NAC_2, . . . , NAC_N, each corresponding to one of N respective sets of PDI addressable entries of protected PDI 124, including PDI_1, PDI_2, . . . , PDI_N. For example, assume that the system 100_3 is connected at a time to a WiFi network, as indicated by a detection condition NAC_1 from either the detector 116_3 or 118_3, as shown in FIG. 5 as provided to the secure controller 120. In response and also shown in FIG. 5, the secure controller 120 selectively enables access (via CTRL) by the bus 104 to the corresponding PDI_1 in the table 126T. Accordingly, the processor 102 is selectively granted such access and can either execute programming in PDI_1 or operate in response to data in PDI_1, or both, for example, only enabling video data to be accessed (and correspondingly captured or displayed) when WiFi is enabled. As another example, if the network attribute condition indicates a mesh network, then an access rule could provide access to the control parameter data with respect to local temperature of a factory floor information or Industry 4.0 related factory sensitive data stored as protected PDI, which only would be enabled for access for mesh communications and not for WiFi or BLE as they are more accessible to mobile and external connectivity for security reasons. As still another example, if the network attribute condition indicates a relatively poor QoS, the processor 102 is selectively granted, by the secure controller 188, access to PDI that may limit the bandwidth sought by communications at the time, so as to stay within constraints expected from the relatively poor QoS. In any event, meanwhile, the bus 104, and consequently the processor 102, is selectively disabled from accessing any other PDI in the table 126T, by a no-access symbol next to PDI_2 and PDI_N.

The system 100_3 can provide selective access to protected PDI 124 to ensure reliability of the device that includes the system 100_3 and also to enforce that the device is safe and secure to run/access PDI from the NVM 110. For example, the access rules 126 can cause the secure controller 120 to selectively enable among different sets of the protected PDI 124 for accessibility to the bus 104 and the processor 102, in response to corresponding network connection status/access control. Such control can ensure compliance with network connection parameters that may differ between different countries or regions. As another example, the access rules 126 may be divided based on network type, for example causing the secure controller 120 to selectively disable the bus 104 access to certain protected PDI 124 programming when the detected network connection condition detects and indicates a low energy Bluetooth connection, while enabling access to that programming when the condition detects and indicates an IEEE 802.15.4 network. As still another example, an access rule 126 can direct the secure controller 120 to selectively disable the system 100_3 from accessing PDI 126 in the form of flash applications and data at run-time if the detected network connection indicates a distributed denial of service (DDoS).

Various of the above-described embodiments for selective access by the secure controller 120, based on location and temperature, also or alternatively can include selective enablement to PDI based on the condition of network connectivity. For example, with the system 100_3 implemented in a smart-grid metering device, an access rule 126 can direct the secure controller 120 to enable bus 104 access to PDI 126 in the form of communication stack data transfer, only when the detected network connectivity condition indicates that communication is established and secured, according to some appropriate measure of each. As another example, with the system 100_3 implemented in a building automation device, an access rule 126 can direct the secure controller 120 to selectively enable the bus 104 access to program PDI 126 only when the detected network connectivity condition indicates a mesh network has been active and established, so that other times access to such program PDI is selectively disabled from access (and thereby preventing the processor 102 from executing such programming when the network connectivity condition is not satisfied). These and other examples can save power and also prevents security vulnerabilities. As another example, with the system 100_3 implemented in automotive ADAS devices, an access rule 126 can direct the secure controller 120 to selectively enable the bus 104 access to program PDI 126 only when valid connectivity and security levels are detected. Conversely, if the these network connectivity conditions are not met, for example if there is a security attack on the network, an access rule (or the same rule, but not being met) can cause the secure controller 120 to selectively disable access to such programming. Accordingly, such embodiments prevent security vulnerabilities in ADAS class devices, which need to be critically controlled.

From the above, example embodiments include a processor-inclusive system with a secure controller, for example implemented in hardware, for selectively enabling and disabling communication of information between a system non-volatile memory and bus in response to the detected condition. Further, such selective access is independent of programming in the processor. Still further, while the above-described attributes are shown and described, changes are also contemplated. For example, while example embodiments provide selective access to protected PDI in NVM, an alternative embodiment may provide selective access to information in memories other than NVM. As another example, one preferred embodiment may provide the processor 102 as a microcontroller, which typically does not include memory protective circuitry, such as a memory management unit (MMU), and also typically operates with a relatively small and built-in memory, such as 5 MB or less of either NVRAM or SRAM in contemporary example implementations. Alternatively, another preferred embodiment may be implemented with the processor 102 as a microprocessor or DSP, which itself may include an MMU for example generally translating virtual and physical addressing, while further including the secure controller 120 for selectively enabling/disabling memory (e.g., NVM) access in response to either environmental or network attribute conditions. As another example, while the above embodiments have been discussed separately with respect to respective conditions of location, temperature, and network connectivity, the access rules may be programmed to include a combination of two or three those conditions at a time, and/or include alternative conditions beyond those three. Accordingly, additional modifications are possible in the described embodiments, and other embodiments are possible, within the scope of the following claims.

What is claimed is:

1. A system comprising:
- a bus;
- a processor coupled to the bus;
- a global positioning system (GPS) receiver coupled to the bus, the GPS receiver configured to provide a signal indicating a condition comprising a geographic location of the system;
- memory coupled to the bus, the memory configured to store a plurality of GPS geographic condition access rules correlated with a plurality of data in the memory, each GPS geographic condition access rule indicating whether a corresponding data is accessible based on the condition; and
- a controller coupled to the GPS receiver and the memory, wherein the controller is configured to:
  - receive the signal from the GPS receiver;
  - determine, based on the signal a corresponding GPS geographic condition access rule within the plurality of GPS geographic condition access rules that indicates whether one data of the plurality of data is accessible; and
  - selectively enable the processor to access the one data via the bus based on the corresponding GPS geographic condition access rule for the condition.

2. The system of claim 1, wherein the condition is a first condition and the GPS receiver is a first GPS receiver, wherein the system further comprises a second GPS receiver configured to detect a second condition, and wherein the controller is configured to prioritize the first condition over the second condition.

3. The system of claim 2, wherein the second GPS receiver is external to the system.

4. The system of claim 1, wherein the condition comprises a level of network security of a network communicating with the system.

5. The system of claim 1, wherein the controller is configured to selectively enable communication of the requested data further based on whether the corresponding access rule depends on an historical parameter associated with the corresponding access rule.

6. The system of claim 5, wherein the historical parameter is based on a prior detected condition and prior level of network security.

7. The system of claim 6, wherein the controller includes a memory configured to store the historical parameter.

8. The system of claim 6, wherein the historical parameter is the condition of the system.

9. The system of claim 1, wherein the data comprises at least one of unprotected data and protected data.

10. The system of claim 1, wherein the condition detector is internal to the system.

11. The system of claim 1, wherein:
- the controller includes an access memory configured to store the plurality of access rules, and a history memory; and
- the controller is further configured to store the condition in the history memory.

12. The system of claim 11, wherein the controller is further configured to search the plurality of access rules in response to receiving the condition to determine whether an access rule among the plurality of access rules is correlated with the requested data and applicable to the condition.

13. The system of claim 12, wherein the controller is further configured to determine, when there is an access rule among the plurality of access rules that is correlated with the requested data and applicable to the condition, whether the access rule is satisfied.

14. The system of claim 12, wherein, when the controller does not find any access rule, among the plurality of access rules, that is correlated with the requested data and applicable to the condition, the controller is configured to disable communication of the requested data.

15. A method comprising:
- sending a memory address from a processor to a controller;
- receiving the memory address from the processor;
- determining whether the memory address is directed to a set of protected data in memory;
- responsive to determining the memory address is addressed to the set of protected data in the memory:
  - sending a signal comprising an indication of a global positioning system (GPS) geographical condition from one of a set of GPS receivers to the controller;
  - storing the indication of the GPS geographical condition in local memory;
  - determining whether the GPS geographical condition corresponds to a GPS geographical condition access rule of a set of GPS geographical condition access rules; and
  - responsive to the GPS geographical condition corresponding to the GPS geographical condition access rule of the set of GPS geographical condition access rules, giving the processor access to the set of protected data in the memory at the memory address corresponding to the GPS geographical condition.

16. The method of claim 15, further comprising:

responsive to determining the GPS geographical condition does not correspond to the GPS geographical condition access rule of the set of GPS geographical condition access rules, disabling a bus to the set of protected data in the memory.

17. The method of claim 15, further comprising:

determining whether the GPS geographical condition access rule is dependent on a history parameter of a set of history parameters; and determining whether the history parameter is satisfied, wherein giving the processor access to the set of protected data in the memory is further responsive to the history parameter being satisfied.

18. The method of claim 15, further comprising:

prioritizing a first GPS geographical condition and a first GPS receiver of the set of GPS receivers over a second GPS geographical condition and a second GPS receiver of the set of GPS receivers.

* * * * *